(12) United States Patent
Ng et al.

(10) Patent No.: US 6,792,685 B1
(45) Date of Patent: Sep. 21, 2004

(54) STABILIZED LASER PLUMB

(75) Inventors: Tuck Wah Ng, Singapore (SG); Hiang How Caleb Heng, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 10/382,477

(22) Filed: Mar. 6, 2003

(51) Int. Cl.[7] .............................................. G01C 15/00
(52) U.S. Cl. .............................. 33/286; 33/283; 33/344; 33/318
(58) Field of Search ........................ 33/286, 283, 344, 33/318

(56) References Cited

U.S. PATENT DOCUMENTS

| | | |
|---|---|---|
| 4,912,851 A | 4/1990 | Rando et al. |
| 5,075,977 A | 12/1991 | Rando |
| 5,459,932 A | 10/1995 | Rando et al. |
| 5,481,809 A | 1/1996 | Rooney |
| 5,509,209 A | 4/1996 | Swierski |
| 5,524,352 A | 6/1996 | Rando et al. |
| 5,539,990 A | 7/1996 | Le |
| 5,541,727 A | 7/1996 | Rando et al. |
| 5,572,797 A | 11/1996 | Chase |
| 5,619,802 A | 4/1997 | Rando et al. |
| 5,644,850 A | 7/1997 | Costales |
| 5,864,956 A | 2/1999 | Dong |
| 5,912,733 A | 6/1999 | Dunlop et al. |
| 5,917,587 A | 6/1999 | Rando |
| 5,950,318 A | 9/1999 | Montes |
| 5,992,029 A | 11/1999 | Dong |
| 6,028,665 A | 2/2000 | McQueen |
| 6,065,217 A | 5/2000 | Dong |
| 6,073,354 A | 6/2000 | Rando |
| 6,101,728 A | 8/2000 | Keng |
| 6,133,996 A | 10/2000 | Plumb et al. |

Primary Examiner—Christopher W. Fulton
(74) Attorney, Agent, or Firm—Dinsmore & Shohl LLP

(57) ABSTRACT

A laser plumb includes a laser, and a mass that is rotatable about a spin axis to stabilize the laser. The mass is mounted to a support to be pivotable about at least one axis, and preferably two axes. The two axes are perpendicular to each other and the spin axis. The laser is mounted to the mass to maintain its orientation relative to the support, as the mass rotates about the spin axis. A weight below the tilt axes aligns the spin axis with the gravitational axis. Preferably, the mass and laser are mounted to the support by a gimballed mount. The plumb optionally includes markings on its base to measure a deflection of the laser from the support, thereby allowing measurement of the angle of inclination of a surface supporting the base.

20 Claims, 7 Drawing Sheets

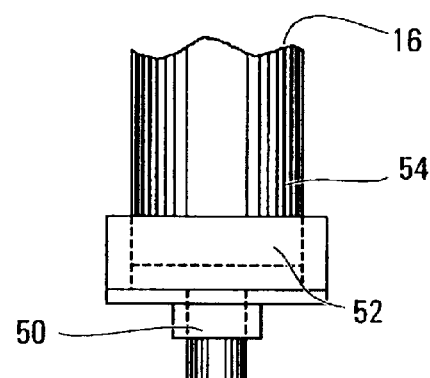
FIG. 3
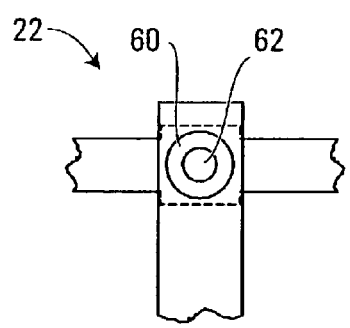   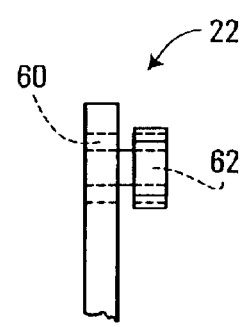   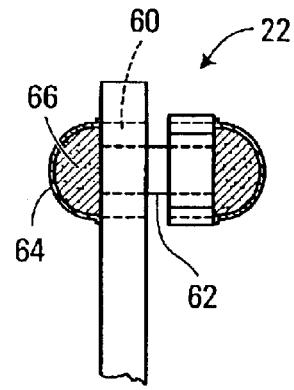
FIG. 4A           FIG. 4B           FIG. 4C
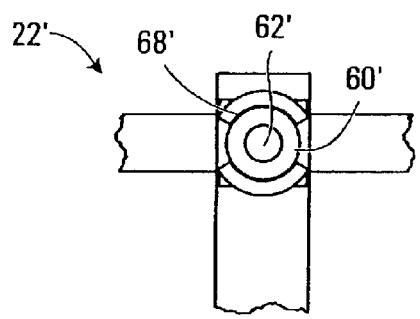           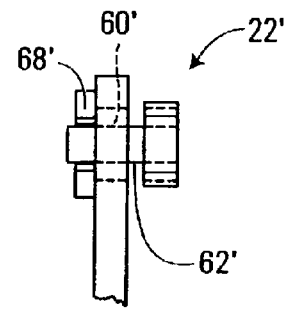
FIG. 4D           FIG. 4E

STABILIZED LASER PLUMB

FIELD OF THE INVENTION

The present invention relates generally to plumbing devices, and more particularly to a laser plumb that is stabilized.

BACKGROUND OF THE INVENTION

A plumb is a device used to ensure alignment along a particular axis, exploiting the force of gravity. Plumbs are used extensively in the construction and mining industries.

A simple plumb is formed by attaching a pointed weight to a thread. Although inexpensive, such plumbs are cumbersome to use: they take a long time to arrive at their position of equilibrium, and may be easily disturbed. Other plumbs make use of the gravitational orientation of water bubbles. These too, only gradually reach their equilibrium position, and are easily perturbed.

As lasers have become readily available and economical, they have been employed in laser plumbing devices. The lasers of such devices are aligned in such devices along the gravitational axis in several different ways. For example, the laser may be part of a simple pendulum.

Typically, laser plumbs perform better than conventional plumbs as the process of plumbing is less cumbersome and the time to arrive at the equilibrium position is shortened. In order to help the plumb settle faster, some laser plumbs are damped.

Once in equilibrium, however, these laser plumbs do not have the ability to maintain their orientation under the influence of external disturbances. In practical applications, it is almost impossible to eliminate external disturbances. Inaccurate plumbing can cause machines and structures to perform poorly or fail catastrophically.

Another shortcoming of existing plumbs is the inability to measure floor tilt. Such tilt information allows for improved horizontal leveling.

Accordingly, there is a need for an improved laser plumbing device.

SUMMARY OF THE INVENTION

An exemplary laser plumb includes a laser, and a mass that is rotatable about a spin axis to stabilize the laser. The mass is mounted to a support to be pivotable about at least one axis, and preferably two axes. The two axes are perpendicular to each other and the spin axis. The laser is mounted to the mass to maintain its orientation relative to the support, as the mass rotates about the spin axis. A weight below the tilt axes aligns the spin axis with the gravitational axis. Rotating the mass about its spin axis stabilizes orientation of the laser. Preferably, the mass and laser are mounted to the support by a gimballed mount.

The exemplary plumb optionally includes markings on its base to measure a deflection of the laser from the support, thereby allowing measurement of the angle of inclination of a surface supporting the base.

In accordance with another aspect of the present invention there is provided a laser plumb, including a base; a support, extending from the base; a rotatable mass pivotably mounted to the support, for rotation about a spin axis and pivotable to allow tilting of the spin axis relative the support about a first tilt axis perpendicular to the spin axis; a weight mounted to the mass beneath the first tilt axis to align the spin axis under the influence of gravity; a laser mounted to the weight, to emit a beam of light along a beam axis, the beam axis pivotable with the mass under the influence of gravity, so as to extend in a fixed direction relative to the direction of gravity when the weight is in equilibrium under the influence of gravity; a motor to spin the mass about the spin axis, so that the angular momentum attributable to the rotatable mass stabilizes the laser.

In accordance with a further aspect of the present invention there is provided a laser plumb including a mass that is rotatable about a spin axis, the mass mounted to a support to be pivotable about two axes, the two axes perpendicular to each other and the spin axis; a laser mounted to the mass, to maintain its orientation relative to the support, as the mass rotates about the spin axis.

In accordance with yet another aspect of the present invention there is provided a laser plumb including, a support; a gimballed gyroscope mounted to the support, the gimballed gyroscope including a flywheel rotatable about a spin axis; a weight mounted to the gyroscope to exert a force on the flywheel to align its spin axis relative to the support, toward the gravitational axis; a laser mounted to the gyroscope, to emit a light beam along an axis having a fixed orientation relative to the spin axis.

In accordance with another aspect of the present invention there is provided a laser plumb including a support; a gimballed mount mounted to the support for rotation about first and second mutually perpendicular tilt axes; a flywheel supported by the gimballed mount, rotatable about a spin axis perpendicular to the first and second tilt axes; a weight mounted to the gimballed mount, to having a center of gravity beneath the first and second tilt axes; a laser coupled to the gimballed mount, having a fixed orientation relative to the spin axis.

In accordance with a further aspect of the present invention there is provided a method of generating a laser plumb line, by way of a laser plumb. The laser plumb includes a laser mounted to a mass. The mass is rotatable about a spin axis. The spin axis is tiltable about at least one tilt axis normal to the force of gravity. The spin axis tiltable with the mass. The method includes, generating a laser beam along a beam axis; aligning the spin axis with the force of gravity; and rotating the mass to gyroscopically stabilize the laser beam along the beam axis.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIG. 3 is an enlarged elevational view of a floor pointer assembly of the laser plumb of FIG. 1;

FIG. 4A–4C illustrate bearing assemblies of the laser plumb of FIG. 1;

FIGS. 4D–4E illustrate alternate bearing assemblies for use in the laser plumb of FIG. 1;

DETAILED DESCRIPTION

Figure 1:
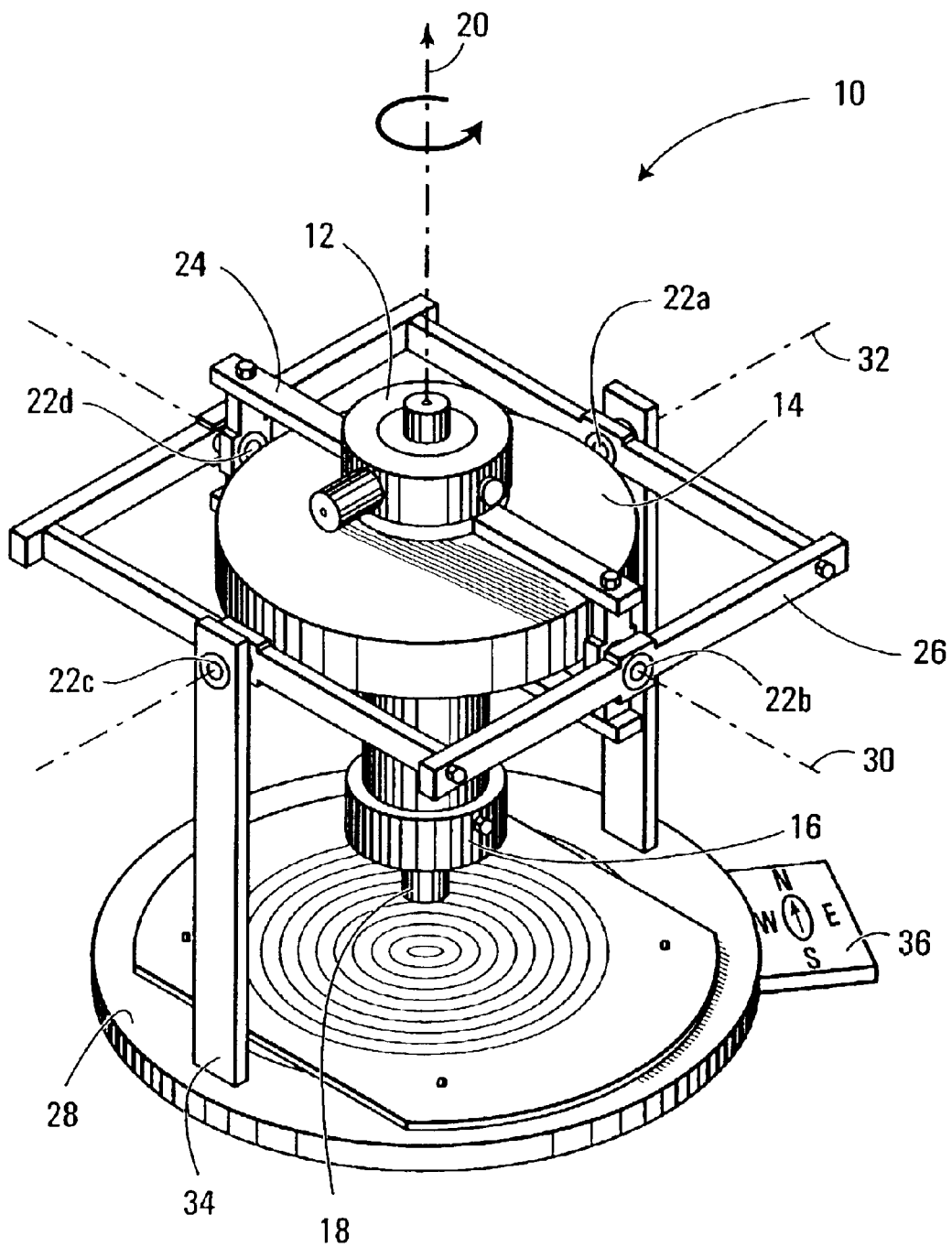
FIG. 1 is a perspective view of a laser plumb, exemplary of an embodiment of the present invention

FIG. 1 is a perspective view of a laser plumb 10 exemplary of an embodiment of the present invention. As illustrated, a laser forming part of a pointer assembly 18 is pivotally mounted to a base 28.

Specifically, floor pointer assembly 18 extends from the base of a motor 16. Motor 16 and pointer assembly 18 are supported by a second rectangular frame 24 that is mounted to a first generally square frame 26 by bearing assemblies 22b and 22d (individually and collectively bearing assemblies 22) to allow pivoting about a first tilt axis 32 (i.e. the y-axis). Frame 26 in turn, is hinged by bearing assemblies 22a and 22c (also bearing assemblies 22) on two opposed vertically extending supports 34 that extend upwardly at right angles from base 28, for pivoting about a second tilt axis 30. The first and second tilt axes are mutually perpendicular. The centers of gravity of frames 24 and 26 are also preferably coincident. Consequently frames 24 and 26 form a two-axes gimballed mount for floor pointer assembly 18.

Motor 16 is coupled to drive a flywheel 14 to rotate about spin axis 20 when motor 16 is energized. Optionally, motor 16 or flywheel 14 may include a brake. Flywheel 14 has a high mass moment of inertia, and is also supported by frame 24 with its center of gravity intersecting the first tilt axis 32 of frame 24. The orientation of spin axis 20 of flywheel 14 relative to base 28 varies with the orientation of frame 24. As illustrated, flywheel 14 and pointer assembly 18 are in a fixed relationship so that pivoting of spin axis 20 also pivots pointer assembly 18. That is, as pointer assembly 18 pivots about the first and second tilt axes, so does flywheel 14. As will become apparent, the high mass moment of inertia of flywheel 14 and its alignment with pointer assembly 18 increases the stability of plumb 10 during plumbing.

In the illustrated embodiment, a further horizontal-vertical pointer assembly 12 including second and third lasers is located at the highest position of plumb 10 and is also mounted to frame 24.

Optionally, plumb 10 may include a compass 36 that may be used to locate magnetic north. Such a compass 36 may be particular useful if plumb 10 is used in mining or construction. Preferably, compass 36 extends from base 28 and is sufficiently magnetically isolated so that any metal forming part of plumb 10 does not affect operation of compass 36.

Figure 2A:
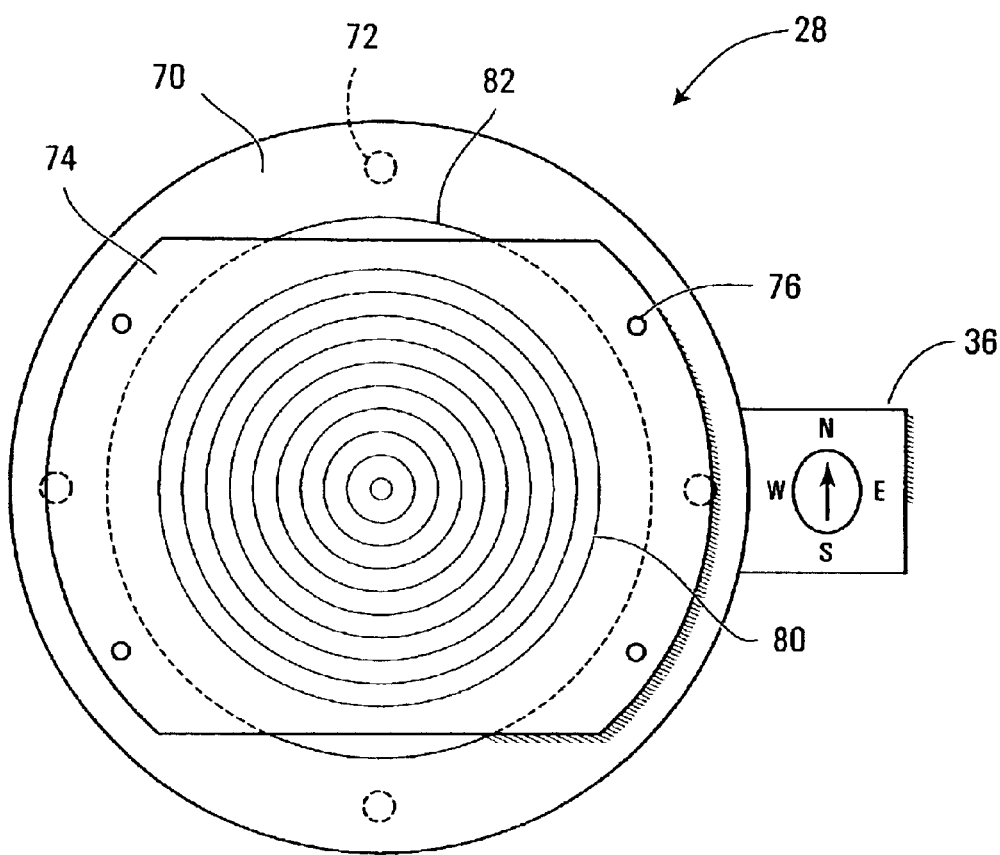
FIG. 2A is a top plan view of a base of the laser plumb of FIG. 1.
Figure 2B:
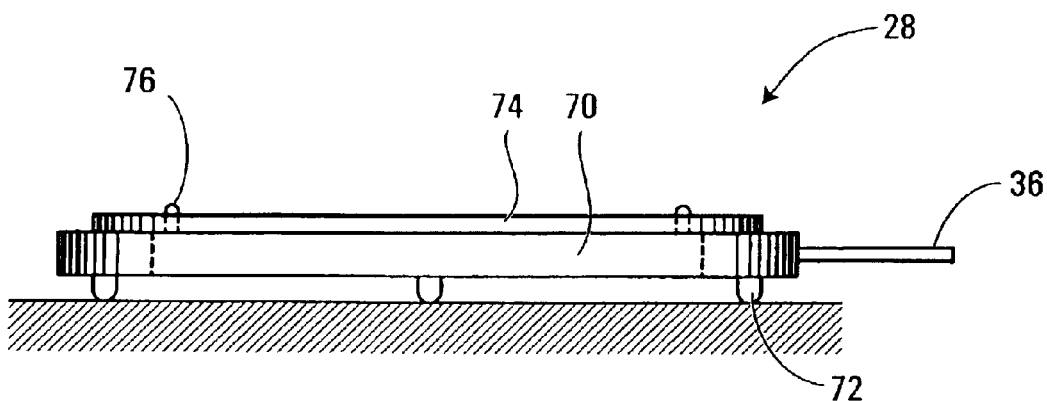
FIG. 2B is a side elevational view of the base of FIG. 2A

An exemplary base 28 of plumb 10 is illustrated in greater detail in FIGS. 2A and 2B. As illustrated, base 28 includes a sturdy circular ring 70, defining an opening 82. Feet 72 in the form of studs are located at equal angular positions about ring 70 and extend from the bottom of base 28. Feet 72 provide kinematic stability when the plumb 10 is placed on a resting surface. Feet 72 are preferably made of durable material, such a rubber or plastic, to withstand wear and tear. Equally spaced locating pins 76 extend upwardly from the top of circular ring 70. These pins allow a removable generally circular plate 74 to be placed concentrically above the circular ring 70 in an accurate manner to obstruct opening 82. Plate 74 has holes that coincide in size and position with locating pins 76. Plate 74 includes a plurality of markers 80 in the form concentric rings. As will become apparent, markers 80 of circular plate 74 may be used to determine the angle of tilt of any support supporting plumb 10. Markers 80 may further include numerals indicative of the angle of tilt. Compass 36 may extend from an edge of base 28.

Floor pointer assembly 18 is more particularly illustrated in FIG. 3. As illustrated, floor pointer assembly 18 includes a laser 50 that generates a laser beam along a beam axis. This laser beam points in a generally vertical direction so that it can be used to vertically align horizontal-vertical pointer assembly 12 in relation to a prescribed point. In the illustrated embodiment, laser 50 is mounted along a central longitudinal axis of floor pointer assembly 18. Optionally, a sleeve 52 that is generally cylindrical in shape extends about pointer assembly 18 about the bottom end of motor 16.

As noted, pointer assembly 18 along with flywheel 14 are mounted to base 28 by the gimballed mount formed of frames 24 and 26. As frames 24 and 26 pivot about their tilt axes, so does the orientation of beam axis of laser 50. Conveniently, the orientation of beam axis of laser 50 is parallel to spin axis 20 of flywheel 14.

Since the center of gravity of the motor 16, sleeve 52 and floor pointer assembly 18 is lower than bearing assemblies 22a, 22b, 22c and 22d (and thus first and second tilt axes) motor 16 sleeve 52 and pointer assembly 18 acts as a gravitational pendulum, supported by the gimballed mount formed by frames 24 and 26. The weights of the motor 16 and the sleeve 52 are generally sufficient to allow free pivoting of the gravitational pendulum, and thus the spin axis 20 of flywheel 14. As will be appreciated, while flywheel 14 is not rotating about its spin axis 20, tilting of frames 24 and 26 to align assembly 18 to the force of gravity is only resisted by the friction of bearing assemblies 22. Optionally, an additional weight 54, in, for example the form of cylindrical ring, may be fitted to the sleeve of the pendulum and floor position locating assembly 18.

Example bearing assemblies 22, 22' used to mount frames 24 and 26 (that may be used as assemblies 22a–22d, FIG. 1) are further illustrated in FIGS. 4A–4F. As illustrated, an example bearing assembly 22 is formed of a rotating shaft 62 mounted on a bearing 60. Optionally, bearing assembly 22 may include damping to reduce settling times of frames 24 and 26 (FIG. 1). As illustrated in FIG. 4C, the bearing assembly 22 may include a fluid container 64 that houses a viscous fluid 66 in fluid communication with shaft 62. Essentially, the viscous fluid 66 inhibits the rotational movement of shaft 62. Of course, container 64 and shaft 62 should be sealed to avoid fluid leakage.

An alternative damped bearing assembly 22' illustrates in FIGS. 4D and 4E includes permanent magnets 68' mounted in proximity to shaft 62'. In bearing assembly 22', shaft 62' should be formed of ferromagnetic or include a ferromagnetic attachment. The degree of damping may be altered by varying the distance between the shaft and permanent magnets and the strength of the magnets.

Figure 5A:
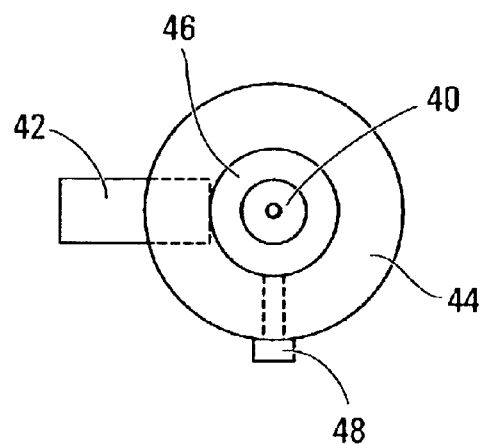
FIGS. 5A and 5B illustrate a vertical pointer assembly including second and third lasers forming part of the laser plumb of FIG. 1.
Figure 5B:
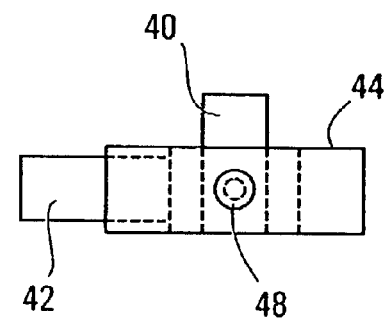

Horizontal-vertical pointer assembly 12 of plumb 10 is more particularly illustrated in FIGS. 5A and 5B (FIGS. 5A and 5B illustrate top and side plan views of assembly 12, respectively). As illustrated, assembly 12 includes two additional lasers; a laser 40 that is fixed and points vertically upwards along the plumb line when plumb 10 is In equilibrium. A further laser 42 at a right angle to laser 40 can be rotated within a plane that is normal to the plumb line.

Vertically extending laser 40 is mounted on a stationary base 46 that is essentially a low profile solid cylinder that extends upward from frame 24 (FIG. 1). Laser 40 preferably extends co-axially with the axis of rotation of flywheel 14. Laser 42 is mounted on a movable rotary base 44 that is essentially a circular ring that fits and rotates freely about the stationary base 46. Laser 42 is mounted at the rim of rotary base 44, and thus will point in different directions as laser 42 is rotated about stationary base 46. A set screw 48 allows rotary base 44 to be locked in an angular position relative to stationary base 46.

Figure 5C:
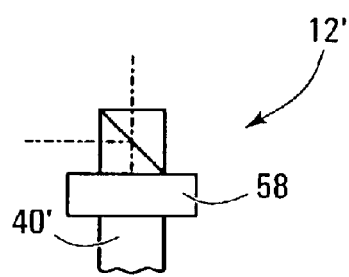
FIGS. 5C and 5D illustrates alternate vertical pointer assemblies, for use In the laser plumb of FIG. 1.
Figure 5D:
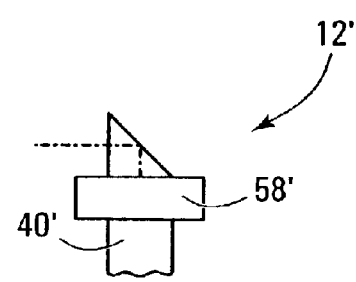

Alternate horizontal/vertical laser pointer assemblies 12' that may be used in place of pointer assembly 12 are illustrated in FIGS. 5C and 5D. As illustrated, two lasers 40 and 42 may be replaced by a single laser 40' and a suitable beam splitter 58 or prism 58'. Beam splitter 58 (FIG. 5C) is rotatable about its central axis, and is mounted atop vertical laser 40'. Beam splitter 58 ensures that a vertically directed beam emanating with laser 40' is split, so that a 50% of the beam is directed in the vertical direction, and the other 50% of the beam is directed in a horizontal plane perpendicular thereto. Rotation of splitter 58 about its central axis controls the actual orientation of the horizontal beam within the plane. Alternatively, a removable prism 58' (FIG. 5D) also rotatable about its central axis may be placed atop laser 40' to redirect a vertical beam from laser 40' in a horizontal plane when required.

A suitable electric power supply for powering motor 16 and lasers 40, 42 and 50 may be housed in an appropriate housing that may be mounted to plumb 10, or may be separate therefrom. Power to each of lasers 40, 42 and 50 and motor 16 may be independently and individually controlled, allowing an operator to energize one or more of the lasers 40, 42 or 50 or motor. Optionally the speed of motor 16 can be varied through control of its power supply. If flywheel 14 or motor 16 are equipped with a brake, a momentary switch may be used to bring the rotation of the motor and flywheel to a halt.

In operation, plumb 10 is placed above a point to be plumbed on floor or the like, as best illustrated in FIGS. 1, 6A–6B and 7A–7B. Motor 16 is preferably not initially energized: flywheel 14 thus does not initially rotate about its spin axis 20. Downwardly extending laser 50 is aimed at a point of interest. Laser 50 remains generally plumb as frames 24 and 26 pivot about bearing assemblies 22a–22d under the influence of gravity on laser 50 (and motor 16 and sleeve 52). The force of gravity on laser 50, motor 16 and sleeve 52 also pivot flywheel 14, so that its spin axis 20 aligns with the gravitational axis.

Once laser 50 is plumb its beam axis is aligned to the gravitational axis. Vertical laser 40, in turn, points vertically upward, and defines a plumb line. Laser 40 will project a point upward toward any ceiling, and directly above the point of interest. Horizontal laser 42, points in a horizontal plane, normal to the plumb line. The direction of horizontal laser within the plane may be adjusted, by rotating rotary base 44 relative to stationary base 46. Once laser 42 points in the desired horizontal direction, locking screw 48 may be tightened. This fixes the angular orientation of horizontal laser 42 relative to assembly 12 to prevent further motion. Graduated markings on assembly 12 and horizontal laser 42 may be used to determine the pointing direction of the horizontal level laser 42.

Now, once laser 50 emits a beam along parallel to the gravitational axis, flywheel 14 may be driven by the motor 16 from rest to rotate to a prescribed constant operating speed to stabilize the orientation of pointer assembly 18, and thus lasers 50, 40 and 42. Rotating flywheel 14 in conjunction with gimballed mount supporting flywheel 14 and floor pointer assembly 18 acts as a gyroscope, stabilizing the orientation of the spin axis 20 of flywheel 14 and pointer assembly 18. The angular momentum of flywheel 14 resists any perturbation of spin axis 20 of flywheel 14. Consequently, the orientation of pointer assembly 18 is similarly stabilized. In this way, plumb 10 is ideal for use in environments where stability is required, or in the presence of perturbations from external forces, such as gusts of wind and vibrations caused by proximate machinery and debris.

Figure 6A:
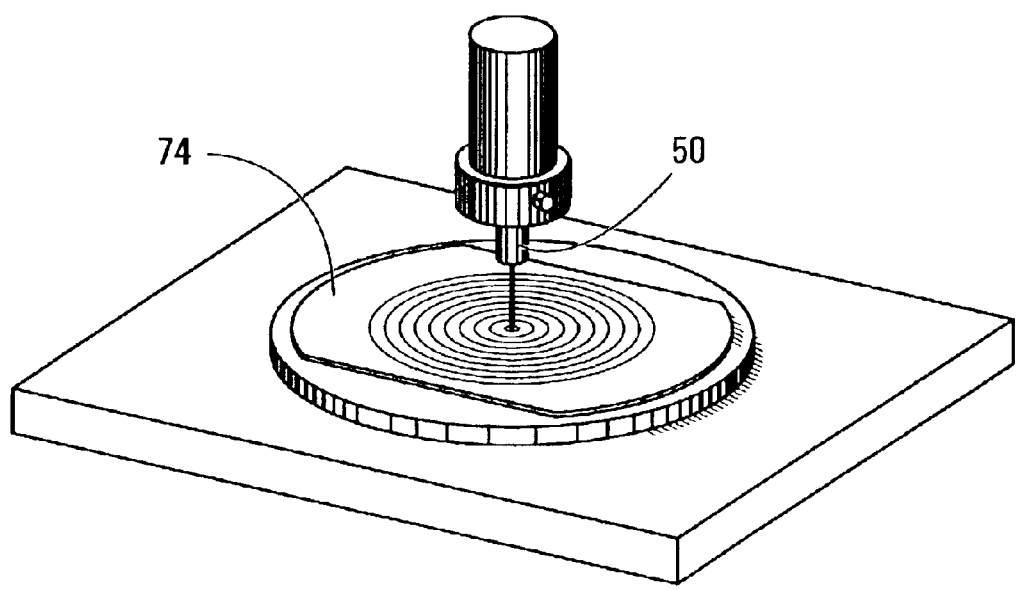
FIG. 6A and 6B are perspective views of a base of the laser plumb of FIG. 1, in operation.
Figure 6B:
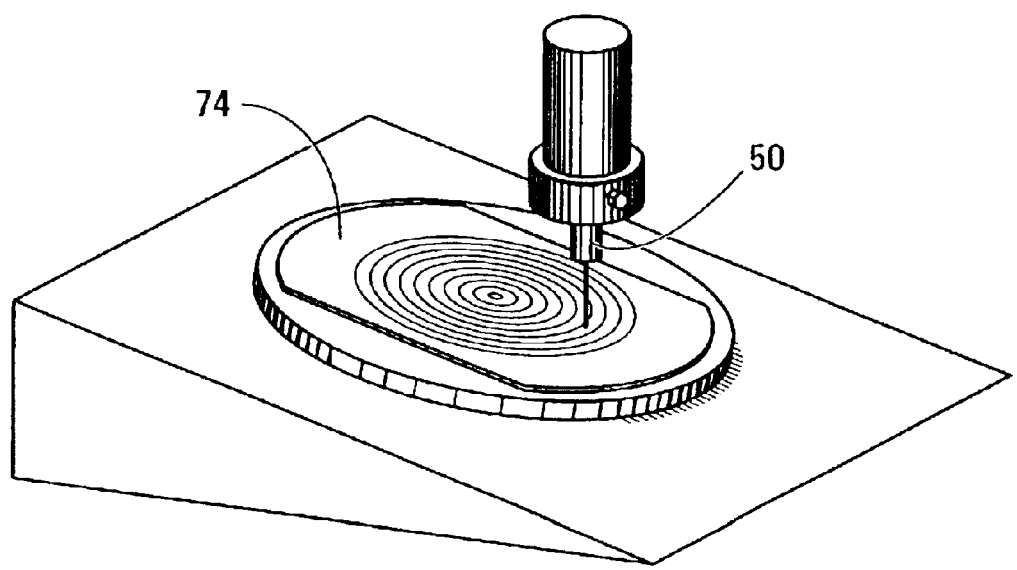
Figure 7A:
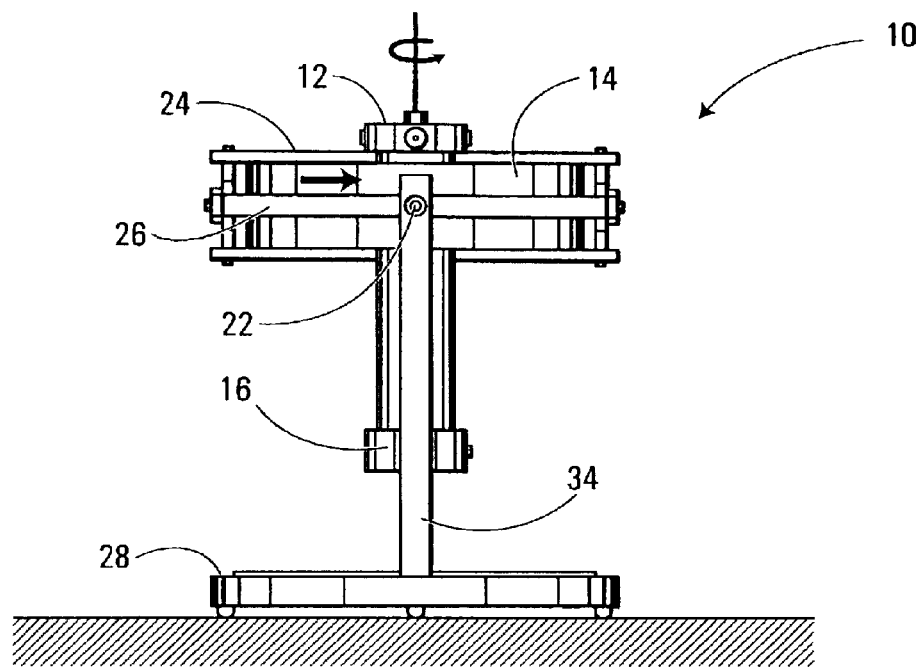
FIG. 7A and 7B are side elevational views of the laser plumb of FIG. 1, in operation.

Downward extending laser 50 creates a light spot on the point of interest, through opening 82 in base 28. Thereafter, tilt measuring plate 74 may be interposed between the point of interest and the beam of laser 50, on base 28. The till of the floor may be determined by reading gradations off the position of the laser light spot in relation to the concentric markings on the circular plate 74. For example, FIGS. 6A and 7A illustrate plumb assembly 10 on a level floor. By contrast, FIG. 6B and 7B illustrates plumb 10 on a tilted floor, having an angle of inclination θ.

Figure 7B:
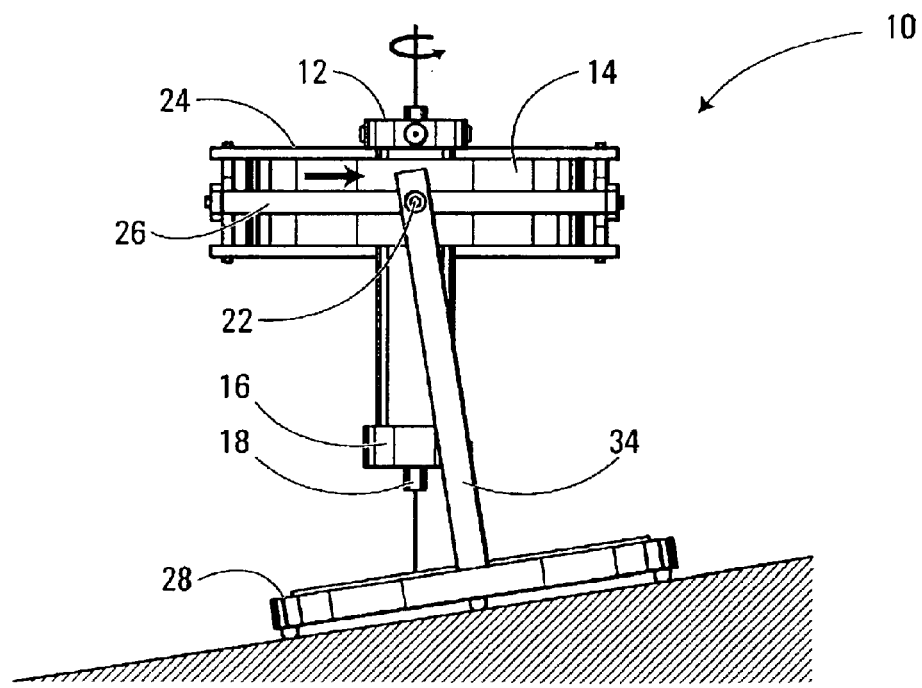

The height of horizontal laser 42 from the locating point is simply given by h2 +h1/cos θ, where h2 is the distance between the second tilt axis 30 and laser 42, and h1 is the distance between the bottom of base 28 and this tilt axis, as illustrated in FIG. 7B. In the case of a horizontal floor, as illustrated in FIG. 7A, the height is merely given by h1+h2. For a tilted floor, the tilt angle θ is obtained using measuring plate 74, as detailed above.

Figure 8:
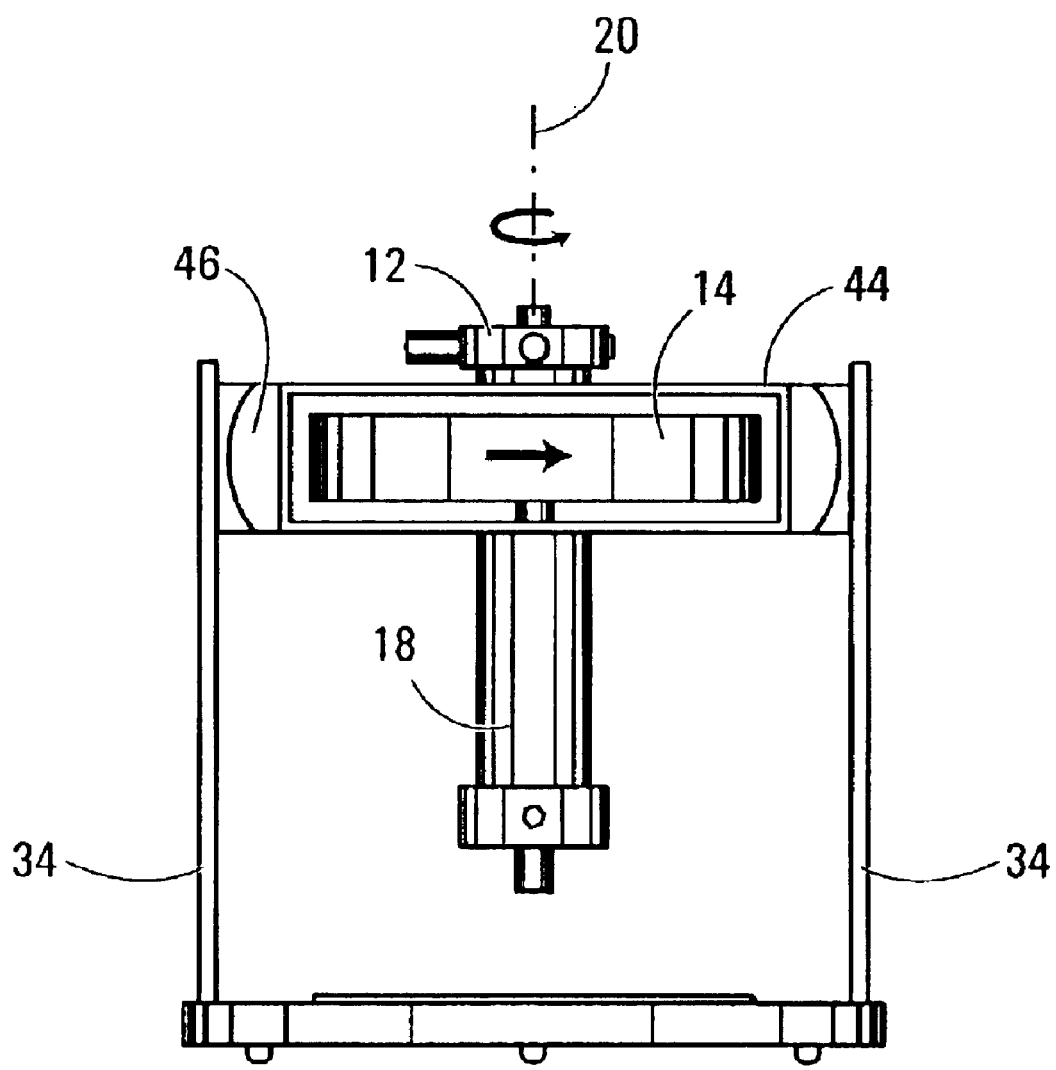
FIG. 8 is a front elevational view of an alternate laser plumb, exemplary of another embodiment of the present invention.

As should now be appreciated, a stabilized laser plumb need not include a gimballed mount for its pointer assembly. As such, plumb 10 could easily be modified to replace the gimballed mount formed by frames 24 and 26 with another mount. As for example illustrated in FIG. 8 pointer assembly 18 could be mounted above base 28 by way of a universal joint. As illustrated, this universal joint may be formed as a ring 44 within a ring mount 46, allowing pivoting of weight 50 about two axes perpendicular to the force of gravity. Other mounts are similarly possible.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A laser plumb, comprising:
    a base,
    a support, extending from said base;
    a rotatable mass pivotably mounted to said support, for rotation about a spin axis and pivotable to allow tilting of said spin axis relative to said support about a first tilt axis perpendicular to said spin axis;
    a weight mounted to said mass beneath said first tilt axis to align said spin axis under the influence of gravity
    a laser mounted to said weight, to emit a beam of light along a beam axis, said beam axis pivotable with said mass under the influence of gravity, so as to extend in a fixed direction relative to the direction of gravity when said weight is in equilibrium under the influence of gravity;
    a motor to spin said mass about said spin axis, so that the angular momentum attributable to said rotatable mass stabilizes said laser.

2. The plumb of claim 1, wherein said rotatable mass is pivotably mounted to said support, for pivoting about a second tilt axis perpendicular to said first tilt as and said spin axis.

3. The plumb of claim 2, further comprising a first frame and a second frame, said second frame supporting said weight and said mass, said first frame mounted to said support for pivoting about said first tilt axis; said second frame mounted to said first frame for rotation relative thereto about a second tilt axis, normal to said first tilt axis.

4. The plumb of claim 3, wherein said support extends normal to said base.

5. The plumb of claim 4, wherein said base comprises markings to measure a degree of deflection of said beam axis from said support.

6. The plumb of claim 5, wherein said marking are arranged in a plurality of concentric circles on said base.

7. The plumb of claim 6, wherein said base defines an opening and further comprises a removable plate to cover said of said removable plate being said markings.

8. The plumb of claim 5, further comprising a first bearing assembly to mount said first frame to maid support for pivoting about said first tilt axis; and a second bearing assembly to mount said second fame to said first frame for pivoting about said second tilt axis.

9. The plumb of claim 8, wherein said first and second bearing assemblies are damped, to damp movement of said pointer laser.

10. The plumb of clam 9, wherein each of said bearing assemblies is hydraulically damped.

11. The plumb of claim 9, further comprising a magnet in proximity to said bearing assembly, to damp said movement of said user.

12. The plumb of claim 2, wherein said laser is parallel to said spin axis.

13. The plumb of claim 2, further comprising a second laser mounted to said weight to produce a laser beam parallel to said beam axis.

14. The plumb of claim 13, further comprising a third laser mounted to said weight to produce a laser beam normal to said beam axis.

15. The plumb of claim 14, wherein said third laser is rotatably mounted to adjust orientation of said laser beam within a plane, normal to said beam axis.

16. The plumb of claim 2, further comprising a compass.

17. A laser plumb comprising;
a mass that is rotatable about a spin said mass mounted to a support to be pivotable about two axes, said two axes perpendicular to each other and said spin axis;
a laser mounted to said mass to maintain its orientation relative to said support, as said mass rotates about said spin axis.

18. A laser plumb comprising:
a support;
a gimballed gyroscope mounted to said support, said gimballed gyroscope comprising a flywheel rotatable about a spin axis;
a weight mounted to said gyroscope to exert a force on said flywheel to align its spin axis relative to said support, toward the gravitational axis;
a laser mounted to said gyroscope, to emit a light beam along an axis having a fixed orientation relative to said spin axis.

19. A laser plumb comprising:
a support;
a gimballed mount mounted to said support for rotation about first and second mutually perpendicular tilt axes;
a flywheel supported by said gimballed mount, rotatable about a spin axis perpendicular to said first and second tilt axes;
a weight mounted to said gimballed mount, having a center of gravity beneath said first and second tilt axes;
a laser coupled to said gimballed mount, having a fixed orientation relative to said spin, axis.

20. A method of generating a laser plumb line, by way of a laser plumb comprising:
a laser mounted to a mass, said mass rotatable about a spin axis, said spin axis tiltable about at least one tilt axis normal to the force of gravity, said spin axis tiltable with said mass;
said method comprising,:
generating a laser beam along a beam axis;
aligning said spin axis to the gravitational axis;
rotating said mass to gyroscopically stabilize said laser beam along said beam axis.

* * * * *

UNITED STATES PATENT AND TRADEMARK OFFICE
CERTIFICATE OF CORRECTION

PATENT NO.    : 6,792,685 B1
DATED         : September 21, 2004
INVENTOR(S)   : Tuck Wah Ng and Hiang How Caleb Heng It is certified that error appears in the above-identified patent and that said Letters Patent is hereby corrected as shown below:

Column 6,
Line 58, insert -- ; -- after "gravity"

Column 7,
Line 3, replace "as" with -- axis --;
Line 20, replace "of" with -- opening, --; and "being" with -- bearing --
Line 22, replace "maid" with -- said --
Line 24, replace "fame" with -- frame --
Line 28, delete "pointer"
Line 29, replace "clam" with -- claim --
Line 33, replace "user" with -- laser --

Column 8,
Line 2, insert -- axis, -- after "spin"
Line 5, insert -- , -- after "mass"
Line 25, delete "," after "spin"

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,792,685 B1
DATED : September 21, 2004
INVENTOR(S) : Ng et al.

It is certified that error appears in the above-identified patent and that said Letters Patent is hereby corrected as shown below:

Column 8,
Line 39, delete "," after "comprising".

Signed and Sealed this

Thirtieth Day of August, 2005

JON W. DUDAS
*Director of the United States Patent and Trademark Office*